United States Patent [19]

Larsson

[11] 4,360,307

[45] Nov. 23, 1982

[54] DEVICE FOR VERTICAL AND/OR HORIZONTAL TRANSPORT OF LOADS INTO AND OUT OF A VEHICLE OR THE LIKE

[75] Inventor: Ralf Larsson, Mölndal, Sweden

[73] Assignee: Ide-Produktion Ralf Larsson, Mölndal, Sweden

[21] Appl. No.: 196,362

[22] Filed: Oct. 14, 1980

[30] Foreign Application Priority Data

Oct. 18, 1979 [SE] Sweden ............ 7908643

[51] Int. Cl.[3] ............ B60P 1/02

[52] U.S. Cl. ............ 414/542; 212/73; 212/74; 212/180; 212/182; 414/921

[58] Field of Search ............ 414/462, 542, 921; 212/73, 74, 142.1, 175, 177, 180, 187, 182

[56] References Cited

U.S. PATENT DOCUMENTS 3,656,637 4/1972 Lynn et al. ............ 414/462 X 3,957,164 5/1976 Brown ............ 414/542

*Primary Examiner*—Robert G. Sheridan

*Attorney, Agent, or Firm*—Holman & Stern

[57] ABSTRACT

A device for vertical and/or horizontal transport of loads into and out of a vehicle or the like and particularly intended to enable disabled wheel chair bound persons to be transferred into and out of a passenger car and comprising a tubular supporting member attached to the car in connection to the vehicle roof and in the lateral direction of the vehicle and being intended to support a supporting arm cooperating telescopically with the supporting member and being displaceable along the supporting member. The supporting arm is adapted to be moveable laterally between a position entirely inside the side of the vehicle and positions outside the side of the vehicle, and the electrically powered lifting device is arranged to be suspended from said supporting arm. It is hereby possible for the disabled himself to load and unload himself and/or his wheel chair and the like in and out of the car resp.

6 Claims, 5 Drawing Figures

DEVICE FOR VERTICAL AND/OR HORIZONTAL TRANSPORT OF LOADS INTO AND OUT OF A VEHICLE OR THE LIKE

BACKGROUND OF THE INVENTION

The present invention refers to a device adapted for transferring wheel chair bound persons and/or equipment belonging to them, e.g. wheel chair, luggage or the like into and out of vehicle by means of a mobile device. Such a device should preferably be possible to use in connection with passenger cars.

For transports outside the home the wheel chair bound person is generally reduced to using governmental or other similar transport organisations for disabled. This is because it is a very heavy work to lift the disabled into a passenger's car manually. Rides, with a governmental transport organisation for disabled and the like shall be ordered well in advance and journeys outside the home district which exceed the allocated quota will be very expensive. These expenses will furthermore be charged privately to the disabled.

For this purpose there has earlier been manufactured a lifting device for disabled, which is mounted adjacent the floor of the passenger's seat side of a passenger car. This lifting device is very complicated and requires a long time to lift the disabled into and out of the passenger's car. This lifting device must be used together with a specially designed chassis frame, which has been adapted to the forward passenger's seat. By means of this chassis frame is it possible to turn and push the chair 90° compared to the normal direction, which is a prerequisite for the using of the lifting device as it must be removed before the legs of the disabled can be introduced. Thereupon it is necessary that the chair with the disabled must be turned to its normal position and be locked therein. This makes it impossible for the disabled to make the transfer from the wheel chair to the car himself, which is a big drawback as many disabled are capable of driving passenger's cars.

A further problem is the remaining wheel chair, which must be folded and lifted into the vehicle.

Furthermore there has also been developed a device for lifting disabled persons into cars, which device has been provided with a supporting beam, attached adjacent the vehicle roof and on which beam it has been possible to cantilever an arm with a lifting device arranged in different manners to be revolvable or bent to make the necessary transport movements, but in any case is it necessary after the loading and prior to the unloading to remove the device or to mount it resp. on the supporting beam, which is not possible for the disabled to make himself.

PURPOSE OF THE INVENTION

The purpose of the invention is to eliminate these drawbacks and to provide a device, which without substantial mounting work can move the load, e.g. the wheel chair into a vehicle without prior mounting of the lifting device and later dismounting of the same. Another purpose is to be able to use the lifting device for transport e.g. of the wheel chair into and out of the vehicle. This has according to the invention been obtained by providing that the supporting member is tubular and support a supporting arm, which cooperates with the supporting member in a telescopic manner and is displaceable along the supporting member and which supporting arm is adapted to be moveable laterally between a position entirely inside the side of the vehicle and positions outside the side of the vehicle, whereby the lifting device is arranged to be suspended from said supporting arm.

DESCRIPTION OF THE DRAWINGS

The invention will hereinafter be further described with reference to embodiments shown in the accompanying drawings.

DESCRIPTION OF THE EMBODIMENTS

Figure 1:
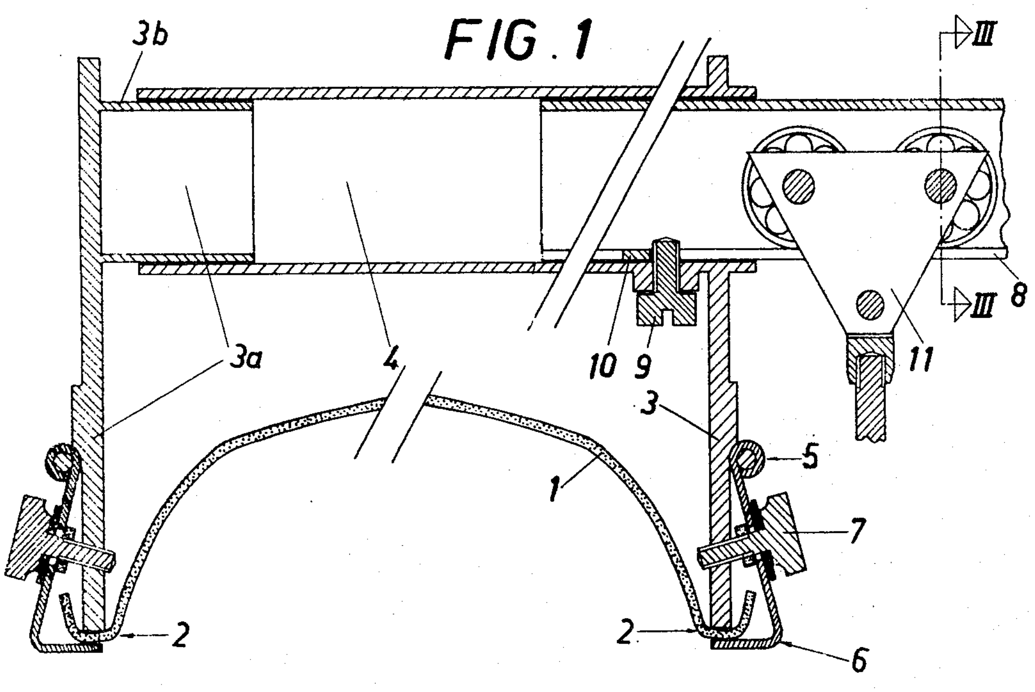
FIG. 1 shows a partial cross-section through a portion of the device according to the invention as seen in the longitudinal direction of the vehicle.
Figure 3:
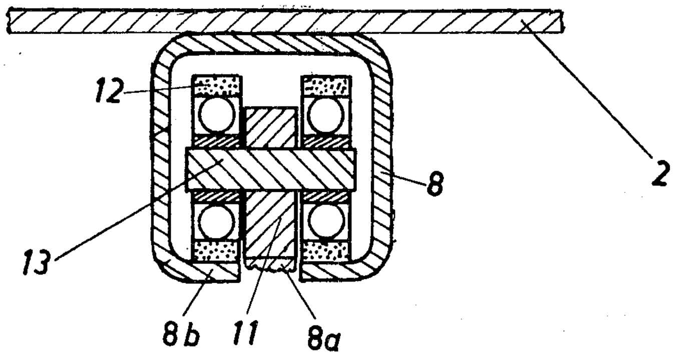
FIG. 3 shows a section along line III—III in FIG. 1.

In FIG. 1 is shown a cross-section through a portion of a passenger car's roof 1 with the drip mouldings 2, on which are detachably attached attachment members 3, 3*a*, which carry a tubular supporting member 4, which in the example shown is fitted above the vehicle roof in its lateral direction. In the example shown one of the attachment members 3 is formed integrally with the supporting member 4, whereas the other attachment member 3*a* is formed separately and is provided with a connection piece 3*b*, which is detachably insertable into the end of the supporting member turned from the integral attachment member 3. In this manner the attachment members 3, 3*a* of the supporting member are adaptable within certain limits to different lateral sizes of vehicle roofs. The two attachment members 3, 3*a* are connectable to the drip mouldings 2 by means of braces 6 pivotably supported in hinges 5, which braces by means of locking handles 7 can be brought to a locking position below the drip moulding. The supporting member 4 carries in telescopic manner a supporting arm 8, which can be pulled out therefrom in lateral direction, and which supporting arm is preferably also tubular. The extended length of the supporting arm is limited by a stop screw 9, which is arranged through the supporting member 4 and adapted to stop the pulling out of the supporting arm against a stop 10 arranged on the supporting arm. The preferably tubular supporting arm is provided with a bottom slot 8*a* (See FIG. 3) along a major part of its length, through which slot the stop screw 9 extends and runs at the displacement of the supporting arm. The supporting arm is furthermore provided with a trolley 11, which can travel in the longitudinal direction of the supporting arm and which is provided with connection members which extend through said slot in the supporting arm and which at its lower end carry a lifting device not shown in this figure. FIG. 3, which is a cross-section along line III—III in FIG. 1, shows the supporting arm 8 designed with a quadratic tubular cross-section and with the above mentioned bottom slot 8*a*. The flange portions 8*b* at both sides of the bottom slot is here defined as race tracks for trolley wheels or as in the example shown as bearings 12, which via a shaft 13 carries the trolley 11. In such a manner is it possible for the not shown lifting device, which is attached to the trolley 11, to be transferred along the entire portion of the supporting arm, which has been pulled out outside the side of the vehicle.

Figure 2:
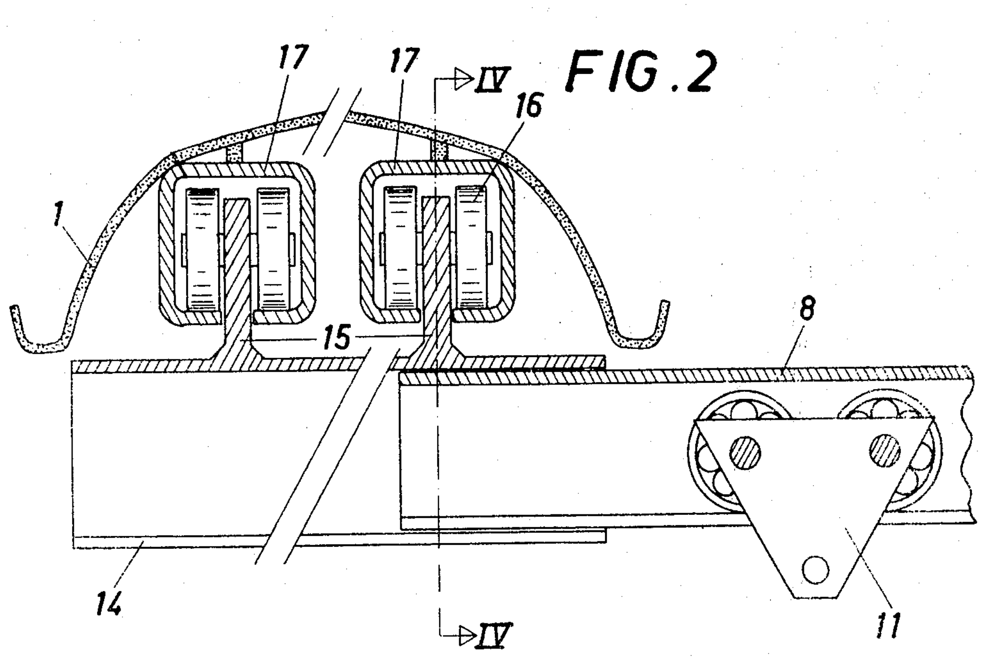
FIG. 2 is a corresponding cross-section through a modified embodiment of the device according to the invention.

In FIG. 2 is shown a modified embodiment of the invention, whereby a supporting member 14 with tubular cross-section, in a corresponding manner as earlier described, carries a supporting arm 8 with a trolley 11 capable of travelling therein and designed in the same manner as at the embodiment according to FIG. 1. The supporting member 14 is however in this case arranged inside the coupė of the vehicle and it is attached to the inner roof by means of carrying flanges 15 each provided with trolley wheels or bearings 16, which roll against roller tracks in tubular carrying beams 17 attached to the inner roof of the vehicle and at the bottom provided with slots, which beams extend in the longitudinal direction of the vehicle. On these longitudinal carrying beams 17 the supporting member 14 is moveable in the longitudinal direction of the vehicle when the supporting arm 8 has been pushed in so much that its outer end lies inside the door of the vehicle. It is hereby possible to move the lifting device between the forward seat and back seat of the vehicle whereby e.g. a disabled person can lift himself into the forward seat by means of the device and thereupon from his position in the forward seat manually or by means of any suitable remote control guiding locate the lifting device in the backs seat position and there lift the wheel chair or the like into the vehicle.

Figure 4:
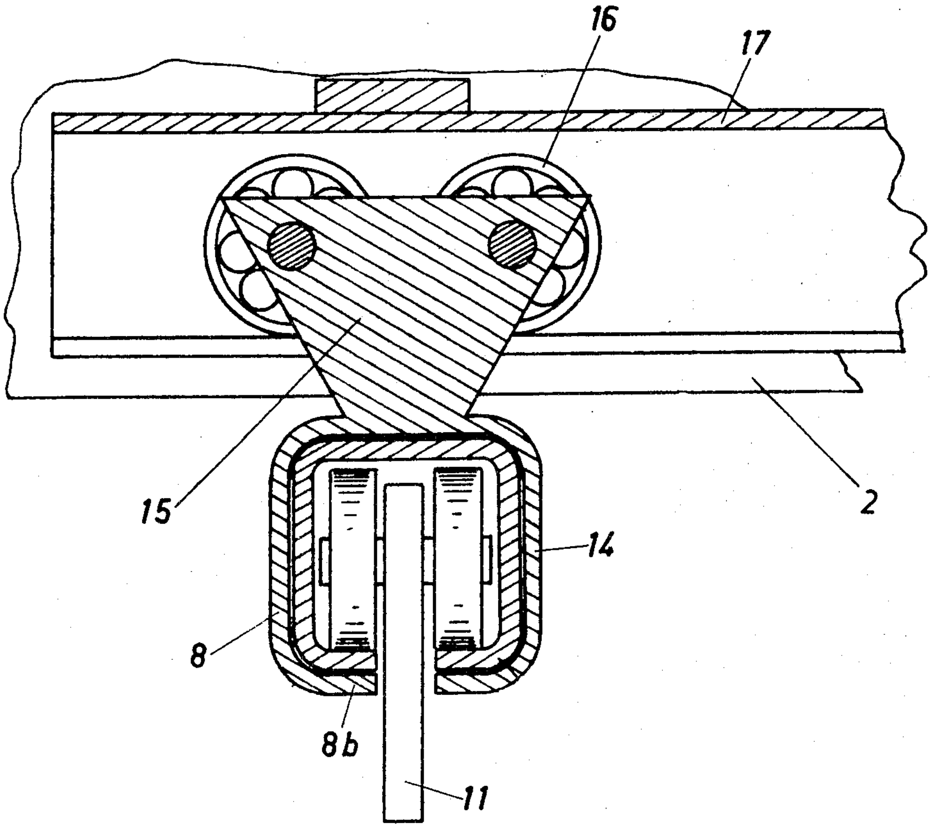
FIG. 4 shows a section along line IV—IV in FIG. 2.

In FIG. 4 is shown in a section along line IV—IV in FIG. 2 a portion of this arrangement. By means of such an arrangement is it possible to make many types of loading and unloading also for a disabled person.

Figure 5:
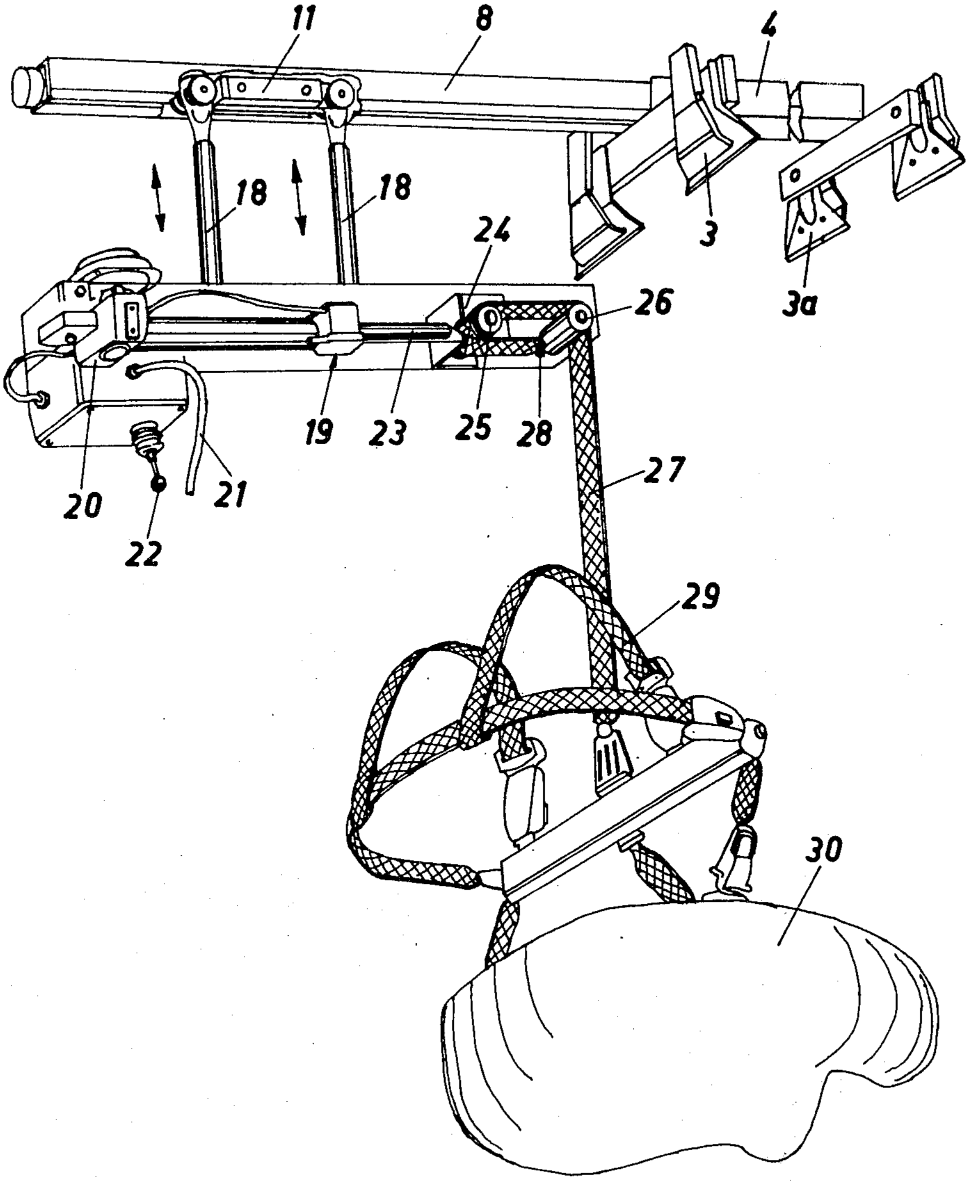
FIG. 5 shows in perspective a device according to the invention.

In FIG. 5 is shown in perspective and schematically an embodiment of a lifting device attached to the supporting arm. The device incorporates the same type of supporting member as that shown in FIG. 1, i.e. a supporting member 4 attached above a car roof by means of attachment members 3, 3*a* and a supporting arm 8, which cooperates in telescopic manner therewith, and which supporting arm carries a trolley 11, which can travel in the longitudinal direction of the supporting arm. This trolley 11 carries connecting members 18 from which a lifting device 19 is suspended. The two connecting means 18 are preferably adjustable in the longitudinal direction in any suitable manner in order to make possible that the lifting device can be placed on different levels in relation to the supporting member 4. Hereby is it appropriate that the connecting members 18 are designed so that their lifting device 19 can be located at a top level where it is in inactive position together with the supporting arm 8 and can be pushed in between the supporting member 4 and the roof of the car, and a lower position in which the lifting device 19 is located at a level with the door of the car.

The lifting device 19 incorporates a driving device 20 formed as a motor, which is preferably electric and can be driven via a cable 21 connected to an appropriate electric source. The motor is reversible and its driving direction can be controlled by means of a control handle 22. In the embodiment shown the motor drives a ball screw mechanism 23, at the free end of which is arranged a yoke 24, which carries a first pulley member 25. On a distance from the said first pulley 25, which thus is moveable together with the moveable end of the ball screw mechanism, is arranged a second, firmly attached pulley 26. The two pulleys 25 and 26 are preferably arranged linearly in the extension of the ball screw mechanism. A lifting element in the form of a belt 27 is in one of its ends fixed to an attachment point 28 located adjacent the second pulley 26. A lifting belt is therefrom arranged over the moveable first pulley 25 and back again over the second pulley 26, wherefrom the free part of the lifting element hangs down and at its free end carries a lifting member in the example shown a harness with a seat plate 30.

When the driving motor via the control handle 22 is put into operation in one direction the ball screw mechanism 23, will transfer the rotating movement of the motor into a linear movement which will pull the yoke 24 in a direction against the driving motor. The moveable first pulley 25 will hereby move away from the firmly attached second pulley 26, which is situated on the opposite side of the first pulley relative to the motor, whereby the lifting belt 27 will be pulled upwards and will raise the lifting member 29, 30. As the free end of the lifting element is attached in level with the second, firmly attached pulley 26 the lifting height will be double the movement of the moveable pulley. In a corresponding manner will the lifting member 29, 30 when the motor is reversed, be lowered at a speed which is double that of the yoke 24 and the moveable pulley 25 and it will also be moved twice as long as this.

Due to the fact that the suspension members 18 of the lifting device are displaced sideways from the pulley 26 for the hoisting arrangement 27, it is possible when the suspension members 18 are in the lowermost positions to move the free end of the lifting device through the vehicle door into the coupė, whereby the seat plate 30 can be located above the passengers chair or above the driver's chair. After the seat plate with the harness have been disconnected from the lifting element is it then possible in the same manner to lift a wheel chair or the like into the vehicle behind the driver's seat, or with a supporting member in accordance with FIG. 2 into the backseat. As the lifting device furthermore has a low height is it possible when the connecting members 18 are in thier upper positions to push in the entire lifting device between the vehicle roof and the supporting member 4, which means that the lifting device must not be removed during driving of the car.

As the driving power for the lifting device and possibly also for travelling motors for the trolleys 11 and 15, resp. can be taken from the vehicle battery is the device also well suited for mounting in a passenger's car and it can be easily controlled also by a single disabled man. It is also possible instead of a hand operated control handle 22 to use some sort of a wireless guidance of the movement of the lifting device and also of the trolleys 11, 15.

The invention is not limited to the embodiments shown in the accompanying drawings but a number of modifications and variations are possible within the scope of the appended claims. Is it thus possible to use different combinations and variations of detailed in the differetent embodiments and it is also possible to use a lifting device designed in another manner than that shown. It is also possible to let the lifting device be firmly connected to the telescopic extendable supporting arm 8 without the scope of the invention thereby being lost.

What I claim is:

1. A device for transporting loads horizontally and vertically into and out of a vehicle or the like of the type comprising a tubular supporting member attached to said vehicle roof and extending laterally thereof, and a lifting device connected to said supporting member and arranged for principally effecting vertical transport, the improvement comprising:

means for spacing said supporting member above said vehicle roof;

said supporting member housing a supporting arm which is displaceable along said supporting member, said supporting member including means for telescopingly moving said supporting arm between a position entirely inside said vehicle to positions outside said vehicle; and said lifting device being suspended from said supporting arm by connecting members having their length vertically adjustable, whereby said lifting device can be moved between an inactive position wherein said lifting device is located between the vehicle roof and the supporting member, and an active position wherein the lifting device is level with the door opening of the vehicle.

2. A device according to claim 1 wherein the supporting arm, which is telescopingly carried by the supporting member, includes surface means for supporting said lifting device in said supporting arm, and the lifting device is an electric motor driven hoisting device arranged to be powered from the battery is said vehicle.

3. A device according to claim 2, wherein said supporting member is a beam attachable to the outside of the vehicle roof, and the lifting device is low in height, and includes supporting wheels which cooperate with said surface means of the supporting arm and are arranged at a distance from the lifting element side of the hoisting device, whereby said lifting element side of the hoisting device is located closer to the vehicle than its supporting wheels.

4. A device according to claim 3, wherein the lifting element of the lifting device is pliable and has one of its ends fixedly attached, the lifting element extending from its point of attachment substantially horizontally to a first pulley, around said first pulley and over a second pulley, said second pulley being firmly attached close to the attachment point of the lifting element, the free end of the lifting element hanging so that said free end can carry a lifting member, whereby the electric motor moves said first pulley linearly in one direction mainly coinciding with the direction of the lifting element between said first and second pulleys.

5. A device according to claim 4, wherein a ball screw mechanism is arranged between the electric motor and said first pulley for acting as a transmission device to move said first pulley linearly.

6. A device for transporting loads horizontally and vertically into and out of a vehicle or the like of the type comprising a tubular supporting member attached to said vehicle roof and extending laterally thereof, and a lifting device connected to said supporting member and arranged for principally effecting vertical transport, the improvement comprising:

means for attaching said supporting member below said vehicle roof;

said supporting member housing a supporting arm which is displaceable along said supporting member, said supporting member includes means for telescopingly moving said supporting arm between a position entirely inside said vehicle to positions outside said vehicle, said supporting member further being provided with supporting wheels and being carried by track members attached to the inner side of the vehicle roof, said tracks extending in the longitudinal direction of the vehicle, whereby the supporting member can be transferred in a longitudinal direction, e.g., between front and rear seats, when the supporting arm has been moved to an inner position inside the vehicle; and said lifting device being suspended from said supporting arm by connecting members.

* * * * *